DANIEL WAGNER & WILLIAM K. BUSHNELL.
Improvement in Elevating Trucks.

No. 114,730.                                                          Patented May 9, 1871.

WITNESSES

INVENTOR

United States Patent Office.

DANIEL WAGNER AND WILLIAM K. BUSHNELL, OF TITUSVILLE, PENNSYLVANIA.

Letters Patent No. 114,730, dated May 9, 1871.

IMPROVEMENT IN ELEVATING-TRUCKS.

The Schedule referred to in these Letters Patent and making part of the same.

*To all whom it may concern:*

Be it known that we, DANIEL WAGNER and WILLIAM K. BUSHNELL, of Titusville, in the county of Crawford and in the State of Pennsylvania, have invented certain new and useful Improvements in Combined Truck and Elevator; and do hereby declare that the following is a full, clear, and exact description thereof, reference being had to the accompanying drawing and to the letters of reference marked thereon making a part of this specification.

The nature of our invention consists in the construction and arrangement of a "combined truck and elevator" for moving and piling or loading barrels and other articles of merchandise, as will be hereinafter more fully set forth.

In order to enable others skilled in the art to which our invention appertains to make and use the same, we will now proceed to describe its construction and operation, referring to the annexed drawing, in which—

Figure 1:
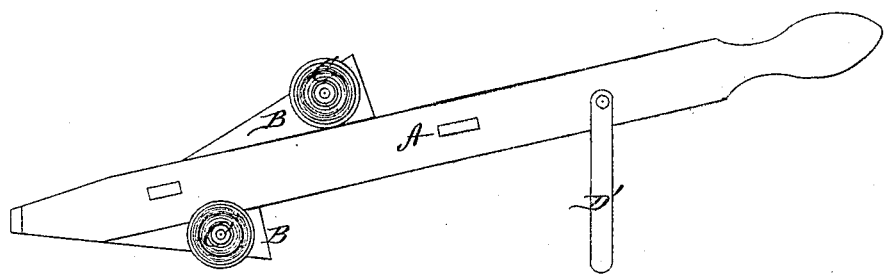

Figure 1 is a side, and

Figure 2:
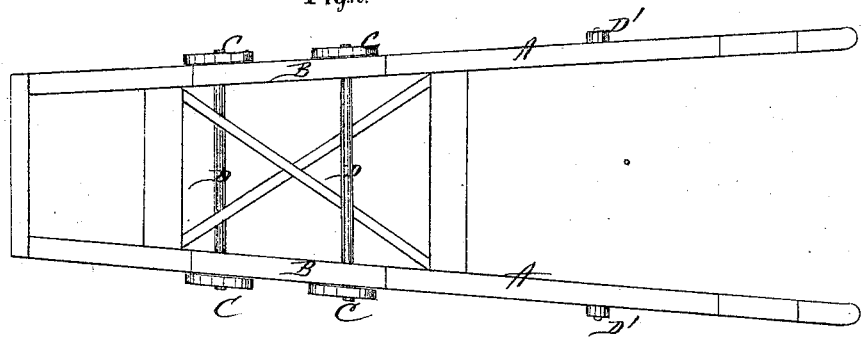

Figure 2 a plan view.

Our truck and elevator is constructed with two side pieces, A A, of sufficient length and capacity to suit the position and purpose to which it is to be applied, and is so braced and ironed as to give it sufficient strength for all uses to which it is adapted.

The elevations, guides, or spurs B B, on both sides of the beams A A, are for the purpose of supporting the burden and guiding it when said beams, which also form the handles of the truck, are raised to a perpendicular or to any desired elevation or position.

The wheels C C act as a fulcrum to assist in balancing the burden, and also as trucks in transporting from place to place.

The axles D D, upon which said wheels are mounted, are placed in such a manner or position as to be about central under the load or burden to be moved or elevated, and of sufficient distance from the lower end of the handles to have the guide or spur, when the handles are raised to a perpendicular, come to just the desired height. They are also arranged so that when the handles are upon the flare or on a level with the point of the spur downward the spur and not the wheel rests upon the ground, which prevents the truck from moving while being loaded.

The wheels and axles are placed upon each side, and at various distances from the lower end to suit the height or elevation upon which the burden or load is designed to be deposited.

The spurs or guides B B are intended to be constructed in such a manner that they can be moved upon the side pieces to a greater or lesser height.

On the handles A A are also pivoted legs D' D', as shown.

The barrel is to be rolled up on the handles up to the spurs or guide B, when the handles are raised and the truck moved to the desired place; then elevate the handles, and the barrel is deposited upon the top of one or two other tiers, as the case may be. This one man can do with more facility and ease than two can do by any other means now in use.

Having thus fully described our invention,

What we claim as new, and desire to secure by Letters Patent, is—

The combination of the side beams A A, braced as shown and described, the stationary or movable spurs B B, wheels C C, axles D D, and legs D' D', all constructed and arranged substantially as and for the purposes herein set forth.

In testimony that we claim the foregoing we have hereunto set our hands this 12th day of January, 1871.

DANIEL WAGNER.
W. K. BUSHNELL.

Witnesses:
FRED. BATES,
S. E. TIFFT.